United States Patent
Dickens et al.

(10) Patent No.: US 11,924,292 B2
(45) Date of Patent: Mar. 5, 2024

(54) DEPLOYMENT UPDATES IN MULTIVENDOR CLOUD ENVIRONMENTS

(71) Applicant: International Business Machines Corporation, Armonk, NY (US)

(72) Inventors: Louie A. Dickens, Tucson, AZ (US); Rodolfo Lopez, Austin, TX (US); Gandhi Sivakumar, Victoria (AU)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 17/111,654

(22) Filed: Dec. 4, 2020

(65) Prior Publication Data

US 2022/0182464 A1    Jun. 9, 2022

(51) Int. Cl.
| | |
|---|---|
| G06F 8/60 | (2018.01) |
| H04L 41/16 | (2022.01) |
| H04L 67/00 | (2022.01) |
| H04L 41/0663 | (2022.01) |
| H04L 41/14 | (2022.01) |
| H04L 43/08 | (2022.01) |

(52) U.S. Cl.
CPC ............. *H04L 67/34* (2013.01); *G06F 8/60* (2013.01); *H04L 41/16* (2013.01); *H04L 41/0663* (2013.01); *H04L 41/145* (2013.01); *H04L 43/08* (2013.01)

(58) Field of Classification Search
CPC ........ G06F 8/60; G06F 9/5072; G06F 9/4856; G06F 2009/4557; H04L 67/10; H04L 41/145
See application file for complete search history.

(56) References Cited

U.S. PATENT DOCUMENTS

| | | | |
|---|---|---|---|
| 8,548,863 B2 | 10/2013 | Diwakar | |
| 9,176,710 B2 | 11/2015 | Motoki et al. | |
| 9,235,409 B1* | 1/2016 | Guo | G06F 8/60 |
| 9,818,127 B2 | 11/2017 | Iyoob et al. | |
| 9,858,060 B2 | 1/2018 | Barros et al. | |
| 10,171,312 B2 | 1/2019 | Kannan et al. | |
| | (Continued) | | |
| 2013/0067448 A1* | 3/2013 | Sannidhanam | G06F 8/60 |
| | | | 717/169 |
| 2014/0053144 A1* | 2/2014 | Jose | G06F 8/65 |
| | | | 717/168 |

OTHER PUBLICATIONS

"Machine Learning Based Statistical Prediction Model for Improving Performance of Live Virtual Machine Migration", Patel, Minal et al, Journal of Engineering, vol. 2016, Article ID 3061674, 9 pages, 2016. https://doi.org/10.1155/2016/3061674, retrieved from internet Mar. 25, 2022 (Year: 2016).*

(Continued)

*Primary Examiner* — Tom Y Chang
(74) *Attorney, Agent, or Firm* — Patterson + Sheridan, LLP (57) ABSTRACT

Deployment updates in multivendor cloud environments are provided by obtaining, from an administrative user, deployment objectives for a network deployment; identifying currently deployed infrastructure in the network deployment; identifying information sources to provide information for evaluating candidates for additional infrastructure to include in the network deployment to meet the deployment objectives; performing a cognitive computing analysis based on the deployment objectives to identify a configuration of the network deployment that includes the additional infrastructure selected from the candidates provided by the information sources; and providing the administrative user with the configuration.

20 Claims, 7 Drawing Sheets

(56) References Cited

U.S. PATENT DOCUMENTS

| | | | | |
|---|---|---|---|---|
| 2014/0215049 | A1* | 7/2014 | Provaznik | H04L 67/1097 709/224 |
| 2016/0078361 | A1* | 3/2016 | Brueckner | H04L 67/10 706/12 |
| 2018/0018154 | A1* | 1/2018 | Burns | G06F 8/61 |
| 2018/0046489 | A1* | 2/2018 | Onoue | G06F 9/5083 |
| 2019/0012605 | A1* | 1/2019 | Rajagopal | G06N 20/00 |
| 2020/0004582 | A1* | 1/2020 | Fornash | G06F 9/4856 |
| 2020/0264919 | A1* | 8/2020 | Vukovic | G06N 20/00 |
| 2020/0334603 | A1* | 10/2020 | Abdollahnejadbarough | G06F 40/20 |
| 2021/0174280 | A1* | 6/2021 | Ratnapuri | H04L 67/10 |

OTHER PUBLICATIONS

Mesbahi, M. R., Rahmani, A. M., & Hosseinzadeh, M. (2018). Reliability and high availability in cloud computing environments: a reference roadmap. Human-centric Computing and Information Sciences, 8(1), 20.

Bruneo, D., Fritz, T., Keidar-Barner, S., Leitner, P., Longo, F., Marquezan, C., . . . & Roth, A. (Jun. 2014). CloudWave: Where adaptive cloud management meets DevOps. In 2014 IEEE Symposium on Computers and Communications (ISCC) (pp. 1-6). IEEE.

Hewlett Packard Enterprise, "HPE Edgeline Converged Edge Systems," Family Guide, 16 pages [Accessed Dec. 4, 2020].

IBM Software, "Explore IBM Software and Solutions," 7 pages, [Accessed Online Dec. 4, 2020] www.ibm.com/products/sofware.

Dyhyan, "Dhyan's Netman, Element Management System," 4 pages, [Accessed Online Dec. 4, 2020] www.dhyan.com/solutions/element-network-management-systems.

IBM Software, "Netcool Network Manager," 7 pages, [Accessed Online Dec. 4, 2020] http://www-03.ibm.com/software/products/en/netcool-network-management.

ibm.com, "IBM Cloud Container Registry," 8 pages [ccessed Online Dec. 1, 2020] www.ibm.com/cloud/container-registry.

hp.com, "HI Jet Advantage Solutions," 5 pages [Accessed Online Dec. 4, 2020] www.8hp.com/us/en/solutions/business-solutions.

* cited by examiner

DEPLOYMENT UPDATES IN MULTIVENDOR CLOUD ENVIRONMENTS

BACKGROUND

The present invention relates to cloud computing, and more specifically, to artificial intelligence and machine learning (ML) models applied as expert systems in cloud computing deployments. Networking environments and data centers include a myriad of computing devices at various locations. Some of these devices are under the control of the user, while others may be partially under the control of the user, and provided as a service by a second party that retains some control over the computing device. Additionally, as networks grow, deployment of the networking environment or data center may be piecemeal; incorporating several devices after initial startup or deployment with different hardware characteristics, operating systems, versions of software, or the like.

SUMMARY

According to one embodiment of the present disclosure, a method is provided that includes: obtaining, from an administrative user, deployment objectives for a network deployment; identifying currently deployed infrastructure in the network deployment; identifying information sources to provide information for evaluating candidates for additional infrastructure to include in the network deployment to meet the deployment objectives; performing a cognitive computing analysis based on the deployment objectives to identify a configuration of the network deployment that includes the additional infrastructure selected from the candidates provided by the information sources; and providing the administrative user with the configuration.

According to one embodiment of the present disclosure, a system is provided that includes a processor; and a memory including instructions that when executed by the process perform an operation comprising: obtaining, from an administrative user, deployment objectives for a network deployment; identifying currently deployed infrastructure in the network deployment; identifying information sources to provide information for evaluating candidates for additional infrastructure to include in the network deployment to meet the deployment objectives; performing a cognitive computing analysis based on the deployment objectives to identify a configuration of the network deployment that includes the additional infrastructure selected from the candidates provided by the information sources; and providing the administrative user with the configuration.

A computer-readable storage medium including instructions that, when executed by a processor, perform an operation comprising: obtaining, from an administrative user, deployment objectives for a network deployment; identifying currently deployed infrastructure in the network deployment; identifying information sources to provide information for evaluating candidates for additional infrastructure to include in the network deployment to meet the deployment objectives; performing a cognitive computing analysis based on the deployment objectives to identify a configuration of the network deployment that includes the additional infrastructure selected from the candidates provided by the information sources; and providing the administrative user with the configuration.

DETAILED DESCRIPTION

The present disclosure provides for consolidating multivendor cloud environments in various states of deployment. As the number of providers of cloud environments constantly changes, as do their offerings, starting an initial deployment or updating an existing deployment of a cloud network can require an experienced professional to expend considerable time and effort to stay abreast of developments in the field and the local deployment to ensure that a deployment is meeting the needs of an organization. Embodiments described herein provide a cognitive interface for users to evaluate a current status of a network environment, which simplifies the process of maintaining a network by analyzing input data and creating a sub-set of potential candidate computing solutions and/or configuration options. When the analytics process completes, the end user is provided with a list of configurations that are ranked highest to lowest. The higher a configuration is ranked, the more closely that configuration is determined to match the entity type of the end user and any requirements specified by the end user.

As various operators and users of cloud network deployments develop expertise, this expertise often becomes a trade secret that is not shared with other entities that could benefit from the practical knowledge of setting up, maintaining, and adjusting a network deployment. The present disclosure provides expert systems that maintain the data privacy of individual operators while sharing the practical experience and expertise in a variety of scenarios, thereby improving the functionality of the cloud deployments using the provided expert systems.

Moreover, determining an optimal or "best" deployment configuration for a set of deployment objectives from a fresh start or "green field deployment" is a very different prospect from determining what an optimal or "best" deployment for the same set of deployment objectives would be when existing (potentially non-optimal) infrastructure is already in deployed. Additionally, as green field deployments can take a significant amount of time to deploy (e.g., in a phased deployment), during which time the available deployment options may change or deployment objectives can change, most projects can include existing infrastructure that eventually is classified as non-optimal. Accordingly, the expert systems described herein use various machine learning models to incorporate feedback from the various deployments to better recommend how and when to add additional infrastructure to existing infrastructure in a deployment.

Although the presently described expert systems can be used in myriad environments, the presented disclosure provides examples related to cloud network environments in general, with specific reference to storage resources, but is not so limited.

Figure 1:
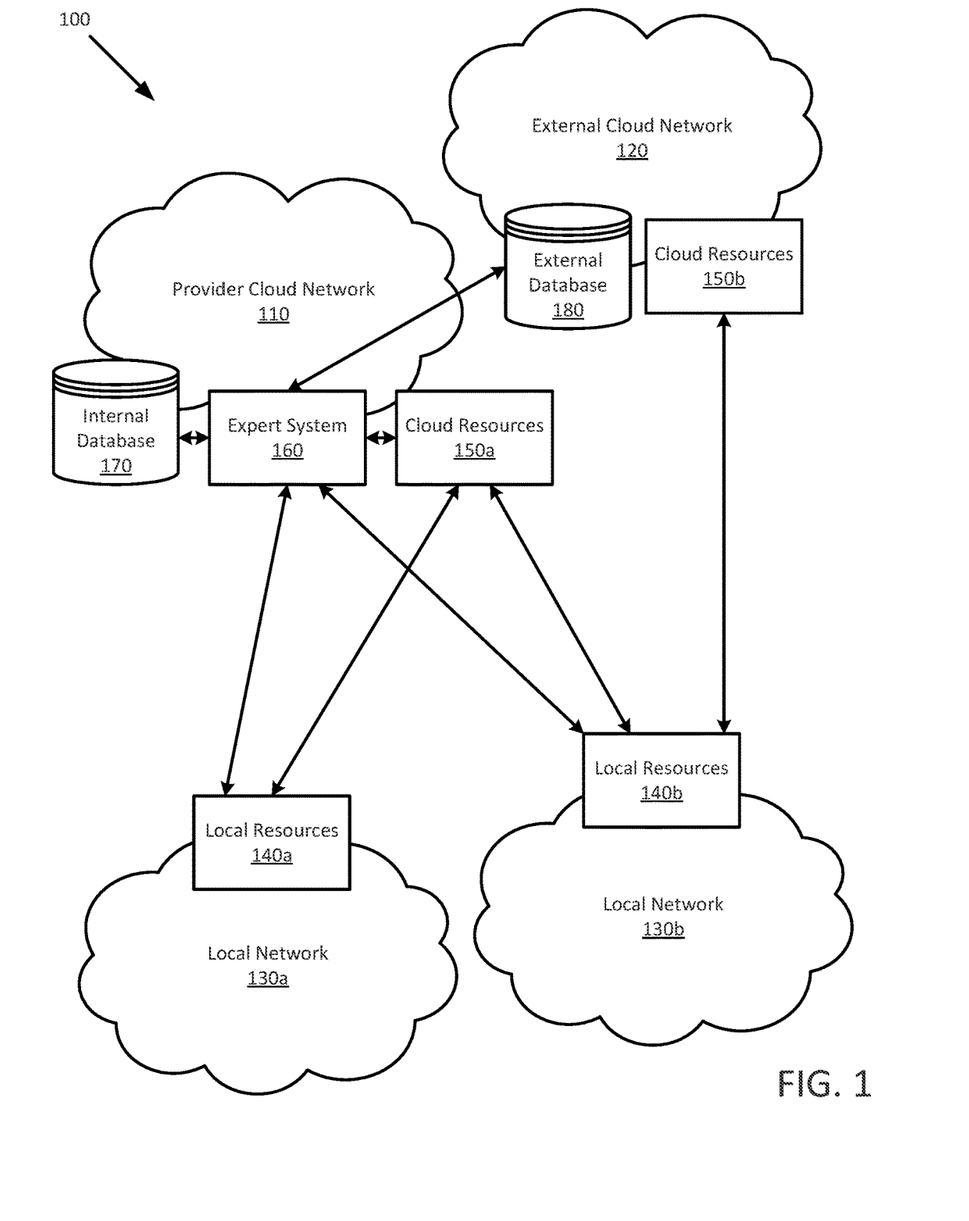
FIG. 1 illustrates a network deployment environment, according to embodiments of the present disclosure.

FIG. 1 illustrates a network deployment environment 100, according to embodiments of the present disclosure. The network deployment environment 100 includes several networks including a provider cloud network 110, an external cloud network 120, a first local network 130a (generally or collectively, local network 130), and a second local network 130b. As will be appreciated, other embodiments of the network deployment environment 100 may include additional external cloud networks 120 provided by different cloud networking providers, and more or fewer local networks 130 managed by various entities.

The provider cloud network 110 is operated by the provider of the expert system 160 described herein, while the external cloud network 120 is operated by a different cloud networking provider. Each of the local network 130 may be operated by different entities, or one entity at different locations (e.g., a first campus in City A and a second campus in City B) and include corresponding first local resources 140a (generally or collectively, local resources 140) and second local resources 140b. These local resources 140 can include the physical infrastructure located in each local network 130, the software hosted locally in the local networks 130, and the various operating systems and platforms used in the local networks 130.

The entities operating the local networks 130 can supplement the local resources 140 by contacting one or more cloud networking providers to use resources provided via one or more cloud service agreements. For example, a first entity managing the first local network 130a can receive cloud services from the provider cloud network 110 to access first cloud resources 150a (generally or collectively, cloud resources 150). In another example, a second entity managing the second local network 130b can receive cloud services from the provider cloud network 110 and the external cloud network 120 to access first cloud resources 150a and second cloud resources 150b respectively.

Figure 6:
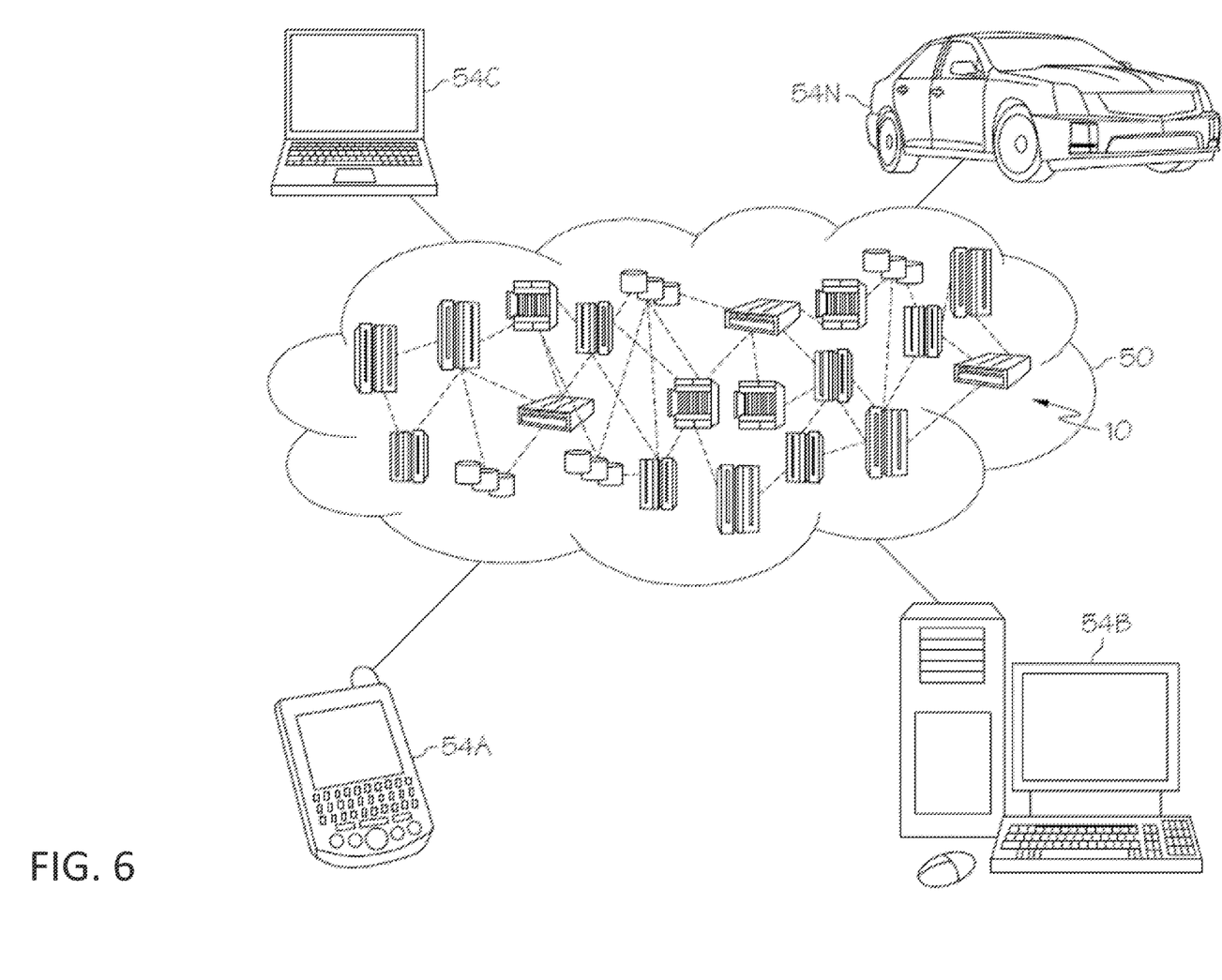
FIG. 6 depicts a cloud computing environment, according to embodiments of the present disclosure.
Figure 7:
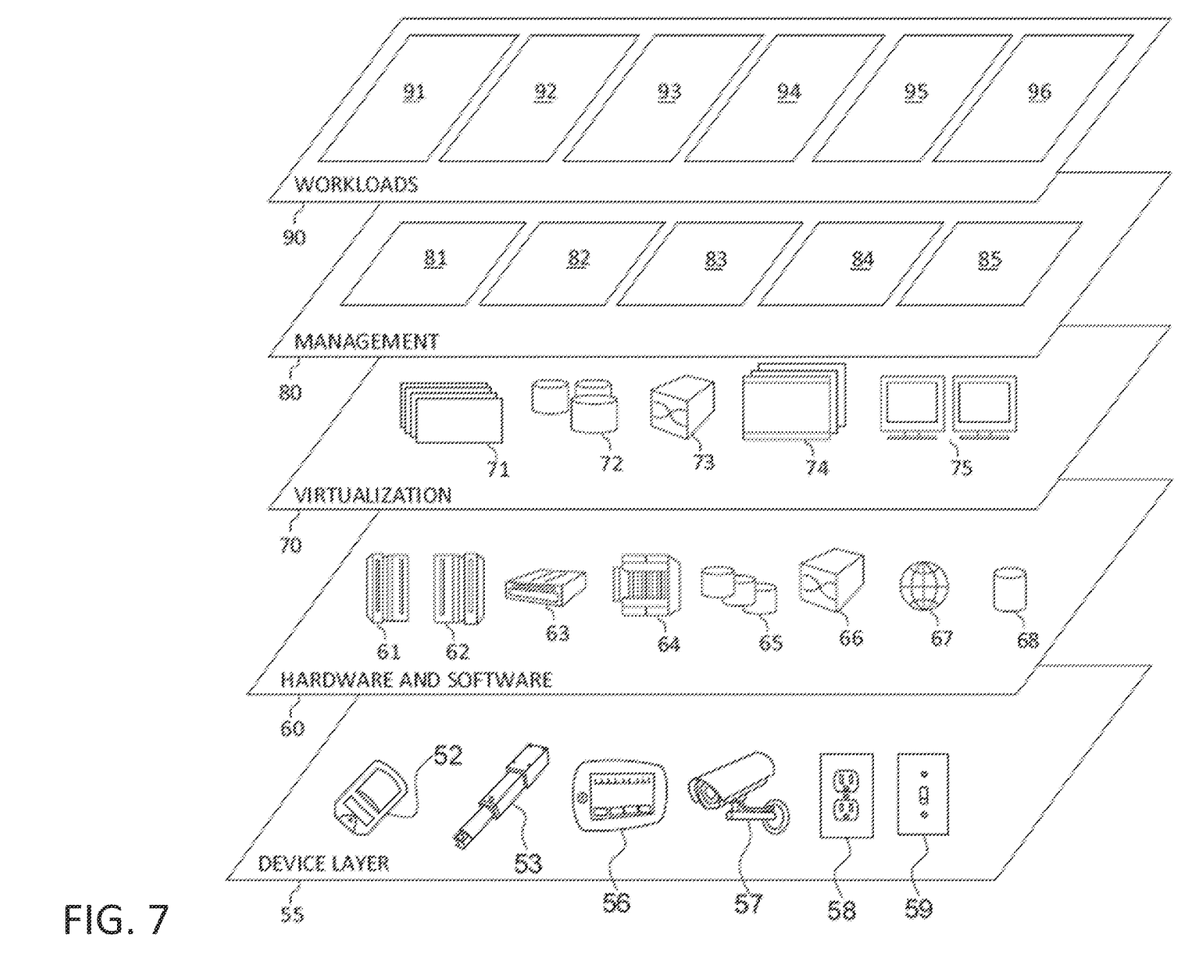
FIG. 7 depicts abstraction model layers, according to embodiments of the present disclosure.

The cloud resources 150, as described in greater detail in regard to FIGS. 6 and 7, can include hardware infrastructure, software services, or platform services that are managed by the respective cloud networking providers and made available to the various entities. One of ordinary skill in the art will appreciate that a large range of different services and levels of provision for those services are contemplated in the described cloud resources 150 that the various local networks 130 access.

The provider cloud network 110 offers the expert system 160 to aid the entities operating the local networks 130 in updating their respective deployments in the multivendor network deployment environment 100 shown in FIG. 1. The updates can include changes to the local resources 140 for each entity, changes in the cloud resources 150 access from a given cloud network, and changes in which cloud networking provider is contracted with to provide the cloud resources 150.

The expert system 160 is in communication with the various local resources 140, the first cloud resources 150a, an internal database 170 that identifies available resources from the provider cloud network 110, and an external database 180 that identifies available resources from the external cloud network 120. The expert system 160 analyzes the currently deployed infrastructure (at the cloud level and local level) to identify what solutions meet the deployment objectives on the entities. These solutions are provided to the entities as configurations, which the administrative users for the entities can select between to update the current deployment in one or more phases. For example, a first entity seeking to increase system uptime as a deployment objective may be provided configurations that provide greater redundancy of services across two or more cloud networks, which the expert system 160 resolves by identifying equivalent services in the internal database 170 and the external databases 180. In another example, the expert system 160 provides to a second entity seeking to consolidate and simplify cloud operations, a configuration that lists a full set of services from one cloud networking provider from the internal database 170 and the external databases 180 that were previously provided by two or more cloud networking providers.

Figure 2:
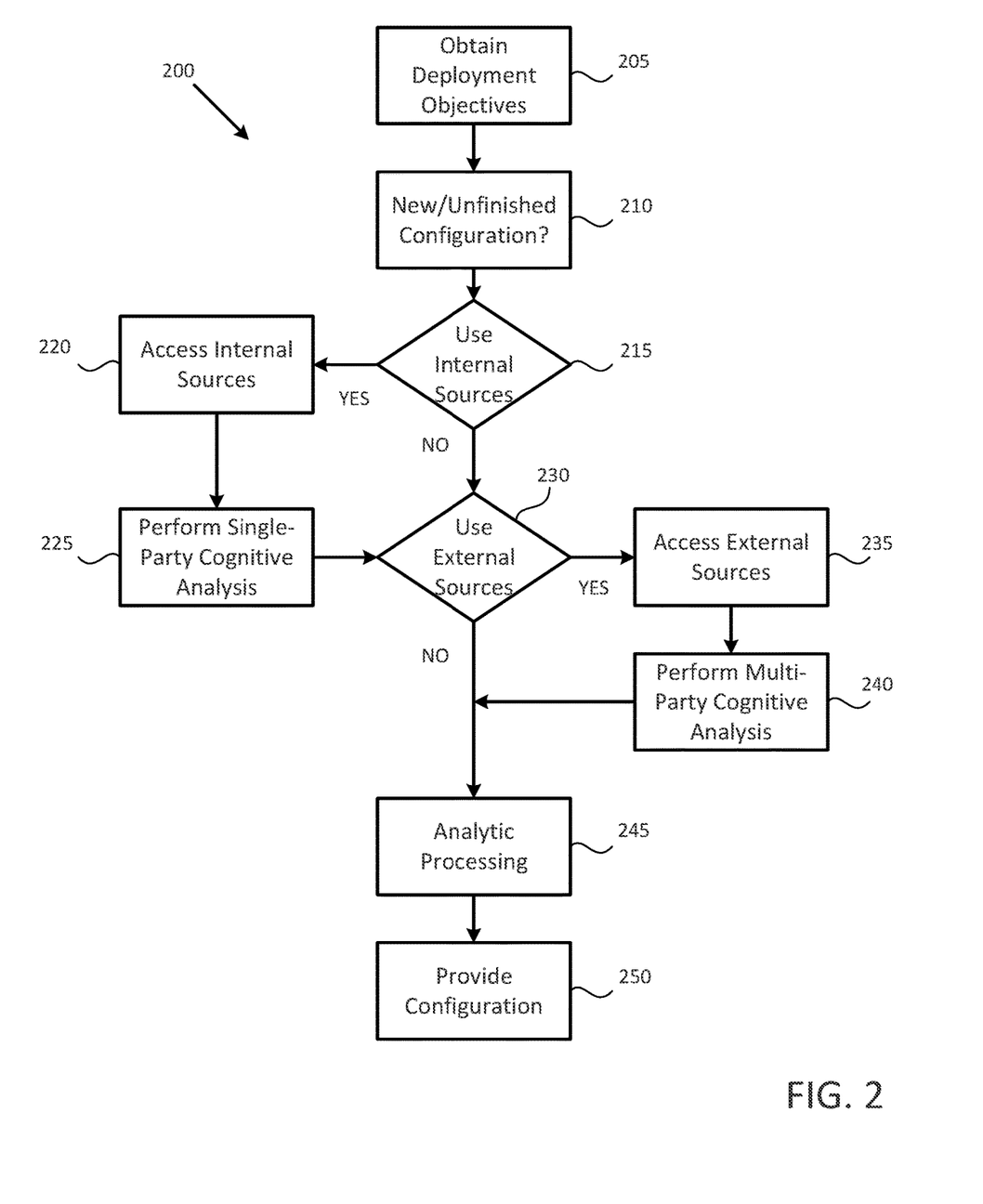
FIG. 2 is a flowchart of a method for updating and consolidating deployments for multivendor cloud environments, according to embodiments of the present disclosure.

FIG. 2 is a flowchart of a method 200 for updating and consolidating deployments for multivendor cloud environments, according to embodiments of the present disclosure. The expert system 160 may perform method 200 in response to receiving or obtaining deployment objectives for an entity at block 205. The deployment objectives may specify a current state of a deployment for the network deployment, and may include objectives related budgetary goals, times of deployment, deadlines for deployment, whether capacity is expanding or shrinking, project longevity, levels of expertise for deployment, and the like.

At block 210, the expert system 160 determines whether the deployment objectives relate to an enhancement (or update) to previous deployment objectives or to finishing an unfinished configuration for the deployment using the current deployment objectives. When the deployment objectives specify an enhancement to an existing configuration, such as when a network is expanding a current storage capacity to include offsite electronic file archiving and offline storage, the expert system 160 identifies the existing infrastructure in the existing configuration to determine how to incorporate the existing infrastructure in the new configuration. When the deployment objectives specify that an existing configuration is to be completed, the expert system 160 identifies any unfinished infrastructure deployments in the existing configuration, such as when a network began preparing to add offline storage capabilities, but previously did not complete the deployment. In various embodiments, a deployment objective can specify one or both that an enhancement and an unfinished configuration are desired. For example, an administrative user can specify that additional networked storage is desired as an enhancement, but that some of the current networked storage only has one pathway to the storage infrastructure, and should be completed by defining a second pathway to the current networked storage.

At block 215, the expert system 160 determines whether the deployment objectives specify whether to use the internal information sources (e.g., internal database 170) provided by the first cloud network provider that provides the expert system 160. The internal information source provides internally managed data for the expert system 160 to evaluate various candidates (including hardware, software, and service agreements) to meet the deployment objectives. When the deployment objectives allow for the use of the internal sources, method 200 proceeds to block 220. Otherwise, method 200 proceeds to block 230.

At block 220, the expert system 160 accesses the internal sources (e.g., via an internal database 170) to identify cloud resources 150 and other resources offered by an internal provider (i.e., the cloud networking provider) that operates the expert system 160. The internal source identifies the various resources offered by the internal provider and various metrics and features of those resources.

At block 225, the expert system 160 performs a single-party cognitive analysis of the resources identified from the internal sources. Method 300, discussed in relation to FIG. 3, describes the cognitive analysis in greater detail. In various embodiments, the cognitive analysis identifies the resources from the internal source that relate to the development objectives, and removes the resources that do not relate to the development objectives. For example, when updating (or completing) a deployment to include additional storage resources, the expert system 160 can identify various onsite and offsite storage infrastructure and services offered by the first provider to include for further analysis, and removes any infrastructure or services not related to storage from further analysis. Operations of block 225 (and/or block 240) are discussed in greater detail in regard to FIG. 3.

At block 230, the expert system 160 determines whether the deployment objectives specify whether to use external information sources (e.g., external databases 180) provided by a different cloud network provider than the cloud network provider that provides the expert system 160. When the deployment objectives allow for the use of the external sources, method 200 proceeds to block 235. Otherwise, method 200 proceeds to block 245.

At block 235, the expert system 160 accesses the external sources (e.g., via an external database 180) to identify cloud resources 150 and other resources offered by an external provider (i.e., a provider other than the cloud networking provider that operates the expert system 160). The external sources identify the various resources offered by the external provider and various metrics and features of those resources.

At block 240, the expert system 160 performs a multi-party cognitive analysis of the resources identified from the external sources. Method 300, discussed in relation to FIG. 3, describes the cognitive analysis in greater detail. In various embodiments, the cognitive analysis identifies the resources from the external sources that relate to the development objectives, and removes the resources that do not relate to the development objectives. For example, when updating (or completing) a deployment to include additional storage resources, the expert system 160 can identify various onsite and offsite storage infrastructure and services offered by a second provider and a third provider to include for further analysis, and removes any infrastructure or services not related to storage from further analysis.

At block 245, the expert system 160 performs an analytic processing analysis on the resources related to the deployment objectives identified by one or more of block 225 and block 240 for resources related to the deployment goals. Method 400, discussed in relation to FIG. 4, describes the analytic processing analysis in greater detail. In various embodiments, the expert system 160 identifies which of the relevant resources meet the deployment objectives via a cost optimization model. Various machine learning models may be employed for different entity types to determine the relevant resources to include in the recommended configuration for an administrative user to consider.

At block 250, the expert system 160 provides the configuration recommendation that identifies the recommended resources to include in the network deployment to the administrative user. In various embodiments, the configuration provides a series of ranked choices, that the administrative user is free to choose among. The higher ranked choices are those that better adhere to the deployment objective than the lower ranked choices. For example, using deployment objectives for increasing service uptime, a choice for a cloud resource 150 with 99% uptime will be ranked higher than a cloud resource 150 with 95% uptime.

Figure 3:
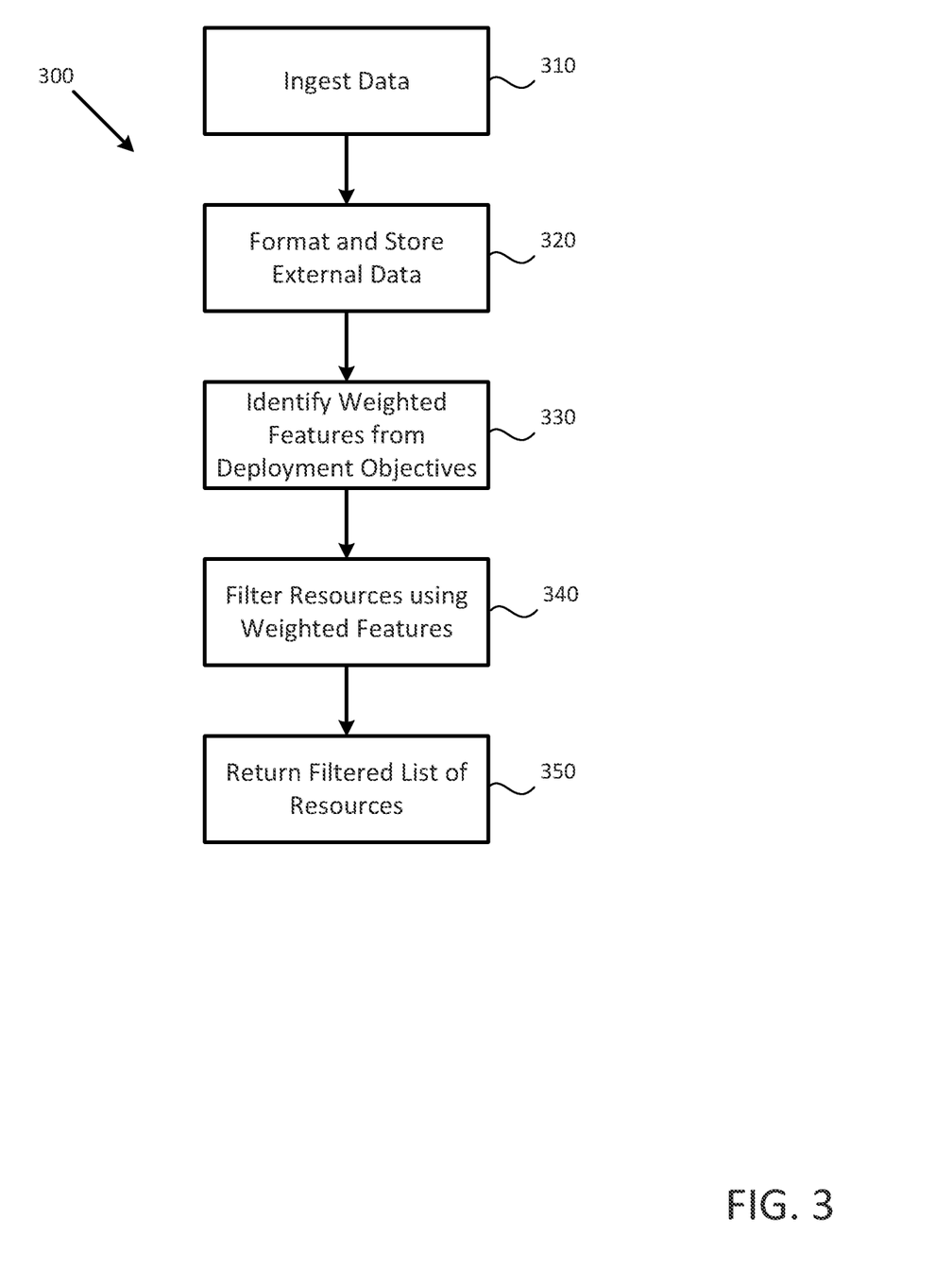
FIG. 3 is a flowchart of a method for cognitive analysis, according to embodiments of the present disclosure.

FIG. 3 is a flowchart of a method 300 for cognitive analysis, according to embodiments of the present disclosure. The expert system 160 may perform method 300 as part of one or more of block 225 and block 240, as described in relation to method 200 in FIG. 2.

At block 310, the expert system 160 ingests data from the identified data sources (e.g., as identified in block 215 or block 230 per method 200). The data sources can include various databases holding data that are pre-formatted for use by the expert system 160, but can also include various public or private data sources that are crawled by a text recognition engine or other data ingestion service. For example, a first provider can host a database with data formatted for use by the expert system 160, a second provider offers an online catalog of resources intended to be read by humans, and a third provider hosts a website reviewing various resources.

At block 320, the expert system 160 (optionally) formats and stores externally ingested data. In various embodiments, the expert system formats and stores externally acquired data in a locally managed database that identifies various extracted features that describe the resource (e.g., name, provider, version number, cost, service model, consumer reviews) and the capabilities of the resource (e.g., storage space, signaling range, uptime, standards used).

At block 330, the expert system 160 identifies weighted features from the deployment objectives. Because the expert system 160 is used by entities that may not know how to precisely format or phrase the deployment objectives to filter out unwanted (or unneeded) resources, in various embodiments, the deployment objectives are submitted as natural language requests. Example natural language deployment objectives might be phrases as: "We need more storage space", "I want a more reliable backup restoration process", or "Our office is expanding and we need to share files across campuses". The expert system 160 parses the natural language text to identify features of the resources to give weight to. In each of the natural language phrases above, for example, the expert system 160 can identify that the underlying deployment objective can involve acquiring more storage for networked devices.

The expert system 160 can extract more than one weighted feature from the each natural language phrases submitted as a deployment objective. Reusing the above examples related to storage, the first example of "We need more storage space" can be interpreted to weight overall storage size (e.g., more bytes of storage space). Similarly, the second example of "I want a more reliable backup restoration process", can be interpreted to weight backup storage solutions (rather than day-to-day storage) and reliability (e.g., offsite versus onsite, higher uptimes). Additionally, the third example of "Our office is expanding and we need to share files across campuses" can be interpreted to weight for storage that is cloud based or network accessible (rather than localized) based. In a further example, when the deployment objective is submitted as a set of natural language phrases that includes each of the three examples, the expert system 160 can extract all of the weights discussed herein.

At block 340, the expert system 160 filters the resources using the weighted features. Continuing the above examples, if the expert system 160 determined that the deployment objectives are related to providing more storage to an entity, any identified resource offered that does not relate to one or more of the identified weighted features is removed from the list of considered resources.

Figure 4:
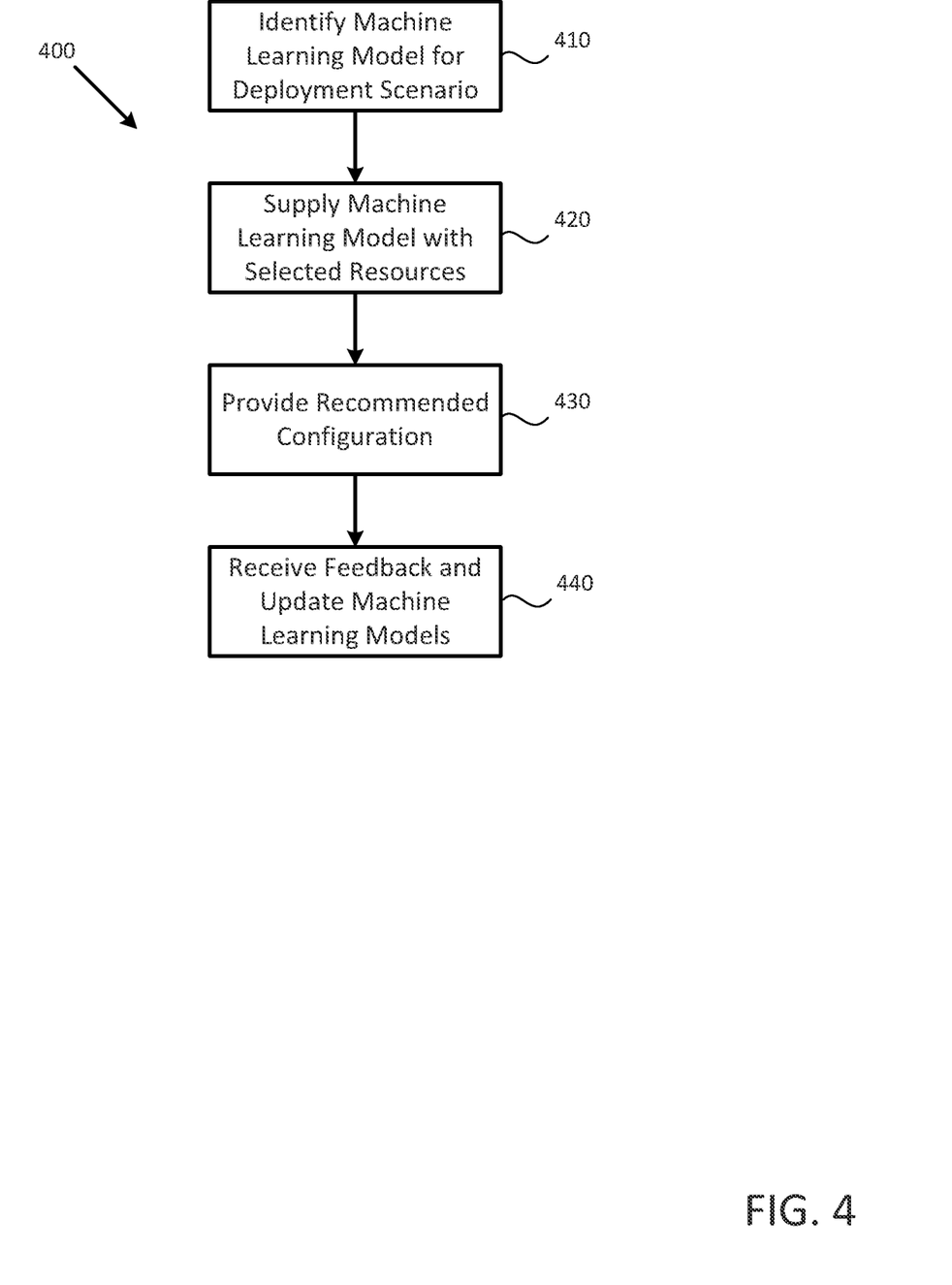
FIG. 4 is a flowchart of a method for analytic processing, according to embodiments of the present disclosure.

At block 350, the expert system 160 returns the filtered list of resources for addressing the deployment objectives, which are then used as inputs for the analytic processing performed in block 245 of method 200 (per FIG. 2) and described in greater detail in regard to method 400 (per FIG. 4). Method 300 may then conclude.

FIG. 4 is a flowchart of a method 400 for analytic processing, according to embodiments of the present disclosure. The expert system 160 may perform method 400 as part of block 245 and block 250, as described in relation to method 200 in FIG. 2.

At block 410, the expert system 160 identifies a machine learning model related to the deployment scenario. In various embodiments, the deployment scenario is affected by the entity type for the entity that submitted the deployment objective. For example, the requesting user may be a small business, a school, a large business, a home user, or some other type of entity. Each entity type is generally associated with different levels of technical support, physical sizes, networking capabilities, and expansion/contraction capabilities. For example, a home user is generally less likely to have dedicated support staff than a large business, and therefore may place greater emphasis on ease of setup or reliability. In another example, a school may have less flexibility in budgeting and deployment time-frames than a small business, and therefore may place greater emphasis on resources that can be installed in one sitting rather than in extended phases of deployment. Accordingly, the expert system 160 selects a machine learning model that is trained to apply different weighting values to the weighted features supplied to the machine learning model based on the observed needs of different entity types.

Additionally or alternatively, the requesting user can specify what machine learning model to use based on a deployment scenario associated with the machine learning model independently of the entity type. For example, a user can request a machine learning model associated with single-phase deployments or extended/multi-phase deployments despite being associated with an entity that more typically uses a different type of deployment. Accordingly, the expert system 160 uses various machine learning models to allow the requesting user to specify various deployment strategies that evaluate the available resources with different emphasis levels of various features associated with given machine learning models trained for the specific situations.

At block 420, the expert system 160 supplies the selected machine learning model with the resources selected for analysis to potentially fulfil the deployment objectives for the entity. The selected machine learning model applies the weighted values to the various weighted features for the selected resources to produce a ranked set of candidate resources to fulfil the deployment objectives. In various embodiments, the ranked set of candidate resources include resources designed to replace currently deployed infrastructure or resources (e.g., a new piece of equipment or service contract to replace a legacy piece of equipment or expiring contract). In other embodiments the ranked set of candidate resources provide additional resources that keep the existing resources and infrastructure in place.

At block 430, the expert system 160 provides a recommended configuration based on the ranked set of candidate resources to an administrative user. In various embodiments, the ranked set of candidate resources includes the X highest ranked candidate resources as identified by the machine learning model. The ranked candidate resources are optionally presented with underlying reasons for why the candidate resources are included in the configuration recommendation. For example, a first-ranked candidate resource is accompanied with the underlying reason of "greatest guaranteed uptime" while a second-ranked candidate resource is accompanied with the underlying reason of "highest uptime to price ratio" to aid the administrative user in selecting on of the candidate resources. Additionally, the configuration identifies the interactions and connections between the resources (both currently deployed and recommended for deployment) to identify where, when, and how to integrate the candidate resources into the user's deployment.

At block 440, the expert system 160 receives feedback and updates the selected machine learning models using the feedback for producing future recommendations based on user experiences. In various embodiments, the feedback includes the selections made by the administrative user (e.g., was the first-ranked candidate resource selected or another resource), where the machine learning models increase the weight values associated with the selected resources and related resources. In some embodiments, the feedback includes later requests sent to the expert system 160 that identifies resources to replace, where the machine learning models reduce the weight values associated with the replaced resources and associated resources.

For example, when a user selects a cloud-based storage solution from the candidate resources, the machine learning model can increase the weight values associated with all cloud-based storage solutions (to indicate a user preference for that type of resource), the weight values associated with the provider or vendor of the selected solution (to indicate a user preference for that provider/vendor), and the weight values associated with other resources sharing others features in common with the selected resource. In another example, when a user selects to replace resource X with resource Y, in addition to increasing the weighting values for resource Y (and other resources sharing common features with resource Y), the machine learning model reduces the weighting values for resource X (and other resources sharing common features with resource X) to reflect updated user opinion on resources X and the related resources. Accordingly, after the configuration recommendation is provided (e.g., per block 430), the expert system may continue monitoring the network deployment to learn how users are implementing the deployments and using the recommended configurations to thereby improve future recommendations (e.g., subsequent iterations of method 200, per FIG. 2).

Figure 5:
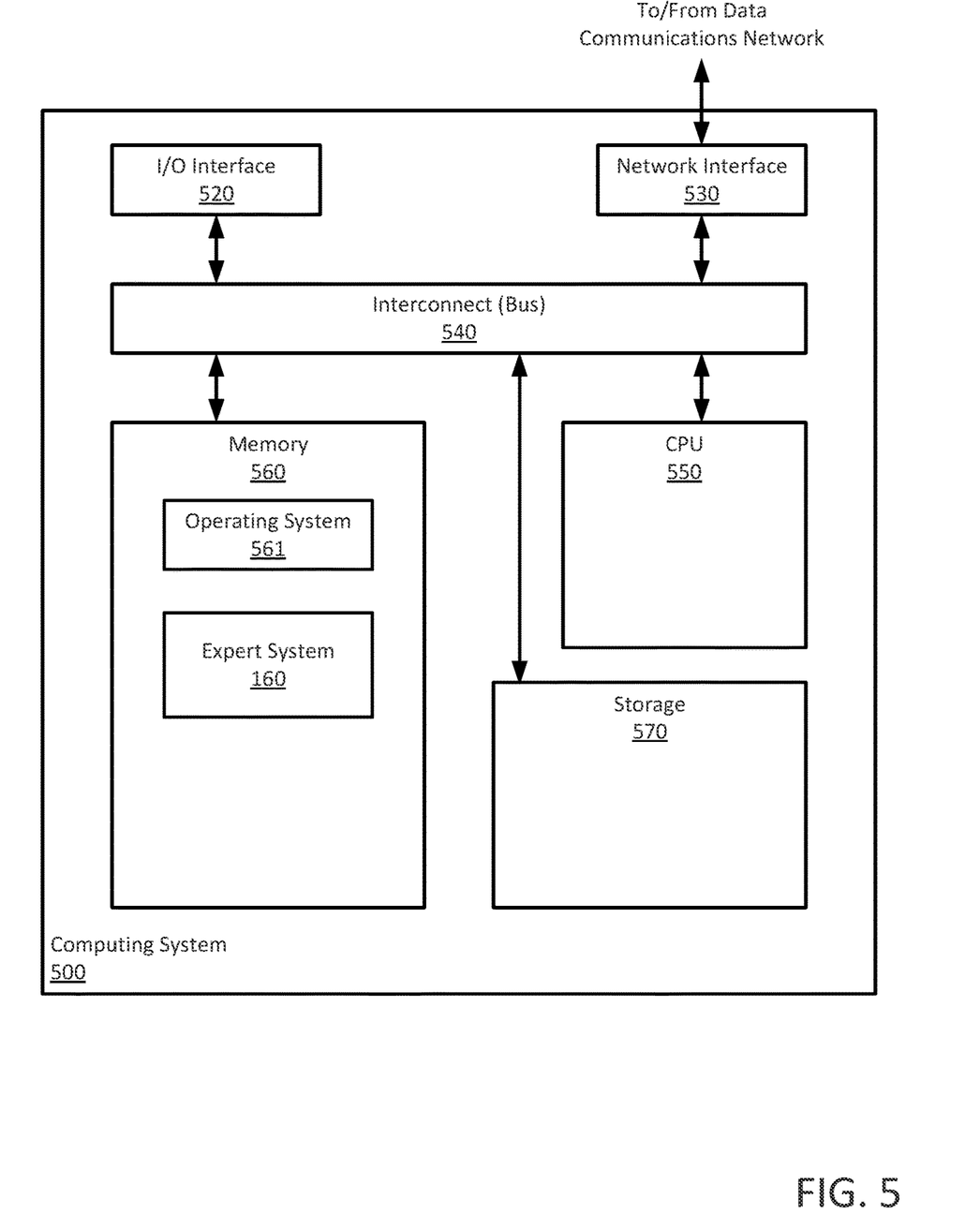
FIG. 5 illustrates a computing system, according to embodiments of the present disclosure.

FIG. 5 illustrates a computing system 500, according to embodiments of the present disclosure. As shown, the computing system 500 includes, without limitation, a central processing unit (CPU) 550, a network interface 530, an interconnect 540, a memory 560, and storage 570. The computing system 500 may also include an I/O device interface 520 connecting I/O devices 510 (e.g., keyboard, keypad, display, touchscreen, biometric scanner, and mouse devices) to the computing system 500.

The CPU 550 retrieves and executes programming instructions stored in the memory 560. Similarly, the CPU 550 stores and retrieves application data residing in the memory 560. These instructions are included in an instruction cache 551 for execution and manipulation as described in the present disclosure. The interconnect 540 facilitates transmission, such as of programming instructions and application data, between the CPU 550, I/O device interface 520, storage 570, network interface or other interconnect 540, and memory 560. CPU 550 is included to be representative of a single CPU, a microprocessor, multiple CPUs, a single CPU having multiple processing cores, and the like. And the memory 560 is generally included to be representative of a random access memory. The storage 570 may be a disk drive storage device. Although shown as a single unit, the storage 570 may be a combination of fixed and/or removable storage devices, such as magnetic disk drives, flash drives, removable memory cards or optical storage, network attached storage (NAS), or a storage area-network (SAN). The storage 570 may include both local storage devices and remote storage devices accessible via the network interface 530 (e.g., cloud storage).

Further, although shown as a single computing system, one of ordinary skill in the art will recognized that the components of the computing system 500 shown in FIG. 5 may be distributed across multiple computing systems connected by a data communications network.

As illustrated, the memory 560 includes an operating system 561, which may include one or more file systems, and a set of processor instructions to perform various actions as described herein. These actions may be informed and formatted according to various applications, such as the expert system 160, running in the memory as instructions executed by the CPU 550.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG.

4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and class balancing training datasets for intent authoring using search 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   obtaining, from an administrative user, deployment objectives for a network deployment, wherein the deployment objectives comprise natural language requests for the network deployment;
   identifying currently deployed hardware infrastructure in the network deployment, wherein the currently deployed hardware infrastructure comprises one of a deployed hardware infrastructure in operation and hardware infrastructure in an unfinished deployment configuration, wherein the unfinished deployment configuration comprises at least one unfinished hardware deployment objective;
   identifying information sources to provide information for evaluating candidates for additional infrastructure to include in the network deployment to meet the deployment objectives and based on the currently deployed hardware infrastructure;
   performing a cognitive computing analysis based on the deployment objectives to identify a configuration of the network deployment that includes the additional infrastructure selected from the candidates provided by the information sources, comprising identifying weighted features for the candidates based on parsing the natural language requests; and
   providing the administrative user with the configuration.

2. The method of claim 1, wherein in response to determining that the information sources exclude external information sources, performing the cognitive computing analysis is based on an internal information source.

3. The method of claim 1, wherein in response to determining that the information sources exclude internal information sources, performing the cognitive computing analysis based on external information sources and other network deployments with other deployment objectives identified as being similar to the deployment objectives.

4. The method of claim 1, wherein performing the cognitive computing analysis further comprises:
   ingesting data for the candidates for the additional infrastructure;
   filtering the candidates based on the weighted features; and
   returning a list of selected candidates that include at least one of the weighted features.

5. The method of claim 4, further comprising:
   performing an analytic processing analysis on the candidates selected from the information sources by:
   identifying a machine learning model associated with a deployment scenario associated with an entity type submitting the deployment objectives;

supplying the machine learning model with the selected candidates to evaluate; and
generating the configuration based on a ranking of the selected candidates evaluated by the machine learning model.

6. The method of claim 5, wherein the analytic processing analysis further comprises:
receiving feedback based on selections made from the configuration; and
updating the machine learning model based on the feedback.

7. The method of claim 1, wherein the additional infrastructure includes replacements for the currently deployed infrastructure.

8. A system, comprising:
a processor; and
a memory including instructions that when executed by the process perform an operation comprising:
obtaining, from an administrative user, deployment objectives for a network deployment, wherein the deployment objectives comprise natural language requests for the network deployment;
identifying currently deployed hardware infrastructure in the network deployment, wherein the currently deployed infrastructure comprises one of a deployed hardware infrastructure in operation and hardware infrastructure in an unfinished deployment configuration, wherein the unfinished deployment configuration comprises at least one unfinished hardware deployment objective;
identifying information sources to provide information for evaluating candidates for additional infrastructure to include in the network deployment to meet the deployment objectives and based on the currently deployed infrastructure;
performing a cognitive computing analysis based on the deployment objectives to identify a configuration of the network deployment that includes the additional infrastructure selected from the candidates provided by the information sources, comprising identifying weighted features for the candidates based on parsing the natural language requests; and
providing the administrative user with the configuration.

9. The system of claim 8, wherein in response to determining that the information sources exclude external information sources, performing the cognitive computing analysis is based on an internal information source.

10. The system of claim 8, wherein in response to determining that the information sources exclude internal information sources, performing the cognitive computing analysis based on external information sources and other network deployments with other deployment objectives identified as being similar to the deployment objectives.

11. The system of claim 8, wherein performing the cognitive computing analysis further comprises:
ingesting data for the candidates for the additional infrastructure;
filtering the candidates based on the weighted features; and
returning a list of selected candidates that include at least one of the weighted features.

12. The system of claim 11, wherein the operation further comprises:
performing an analytic processing analysis on the candidates selected from the information sources by:
identifying a machine learning model associated with a deployment scenario associated with an entity type submitting the deployment objectives;
supplying the machine learning model with the selected candidates to evaluate; and
generating the configuration based on a ranking of the selected candidates evaluated by the machine learning model.

13. The system of claim 12, wherein the analytic processing analysis further comprises:
receiving feedback based on selections made from the configuration; and
updating the machine learning model based on the feedback.

14. The system of claim 8, wherein the additional infrastructure includes replacements for the currently deployed infrastructure.

15. A computer-readable storage medium including instructions that, when executed by a processor, perform an operation comprising:
obtaining, from an administrative user, deployment objectives for a network deployment, wherein the deployment objectives comprise natural language requests for the network deployment;
identifying currently deployed hardware infrastructure in the network deployment, wherein the currently deployed hardware infrastructure comprises one of a deployed hardware infrastructure in operation and hardware infrastructure in an unfinished deployment configuration, wherein the unfinished deployment configuration comprises at least one unfinished hardware deployment objective;
identifying information sources to provide information for evaluating candidates for additional infrastructure to include in the network deployment to meet the deployment objectives and based on the currently deployed infrastructure;
performing a cognitive computing analysis based on the deployment objectives to identify a configuration of the network deployment that includes the additional infrastructure selected from the candidates provided by the information sources, comprising identifying weighted features for the candidates based on parsing the natural language requests; and
providing the administrative user with the configuration.

16. The computer-readable storage medium of claim 15, wherein in response to determining that the information sources exclude external information sources, performing the cognitive computing analysis is based on an internal information source.

17. The computer-readable storage medium of claim 15, wherein in response to determining that the information sources exclude internal information sources, performing the cognitive computing analysis based on external information sources and other network deployments with other deployment objectives identified as being similar to the deployment objectives.

18. The computer-readable storage medium of claim 15, wherein performing the cognitive computing analysis further comprises:
ingesting data for the candidates for the additional infrastructure;
filtering the candidates based on the weighted features; and
returning a list of selected candidates that include at least one of the weighted features.

19. The computer-readable storage medium of claim 18, wherein the operation further comprises:
- performing an analytic processing analysis on the candidates selected from the information sources by:
    - identifying a machine learning model associated with a deployment scenario associated with an entity type submitting the deployment objectives;
    - supplying the machine learning model with the selected candidates to evaluate; and
    - generating the configuration based on a ranking of the selected candidates evaluated by the machine learning model.

20. The computer-readable storage medium of claim 19, wherein the analytic processing analysis further comprises:
- receiving feedback based on selections made from the configuration; and
- updating the machine learning model based on the feedback.

\* \* \* \* \*